United States Patent [19]

Ferguson

[11] Patent Number: 5,176,169
[45] Date of Patent: Jan. 5, 1993

[54] PRESSURE REGULATOR FOR UNDERWATER BREATHING SYSTEM

[75] Inventor: Arthur R. Ferguson, Northbrook, Ill.

[73] Assignee: Dacor Corporation, Northfield, Ill.

[21] Appl. No.: 709,288

[22] Filed: Jun. 3, 1991

[51] Int. Cl.⁵ .............................................. G05D 16/06
[52] U.S. Cl. ............................ 137/454.5; 137/505.42; 137/507; 137/561 A
[58] Field of Search ................... 137/454.5, 454.6, 505, 137/505.42, 505.25, 507, 561 A, 580, 861

[56] References Cited

U.S. PATENT DOCUMENTS

| | | | |
|---|---|---|---|
| 2,652,069 | 9/1953 | Goheen | 137/561 A X |
| 3,834,417 | 9/1974 | Holben et al. | 137/861 X |
| 4,064,899 | 12/1977 | Lehmann | 137/505.25 X |
| 4,655,246 | 4/1987 | Phlipot et al. | 137/505.25 X |
| 4,823,835 | 4/1989 | Chu | 137/580 X |

FOREIGN PATENT DOCUMENTS

| | | | |
|---|---|---|---|
| 1550149 | 12/1969 | Fed. Rep. of Germany | 137/454.5 |
| 7409709 | 2/1975 | Netherlands | 137/861 |

Primary Examiner—Stephen M. Hepperle
Attorney, Agent, or Firm—Welsh & Katz, Ltd.

[57] ABSTRACT

A first stage SCUBA diving regulator has a removable cartridge containing the pressure regulating mechanism and a plurality of intermediate pressure outlet ports extending at acute angles from the body of the regulator. A plurality of rotatable intermediate pressure outlet ports are provided in one embodiment.

12 Claims, 4 Drawing Sheets

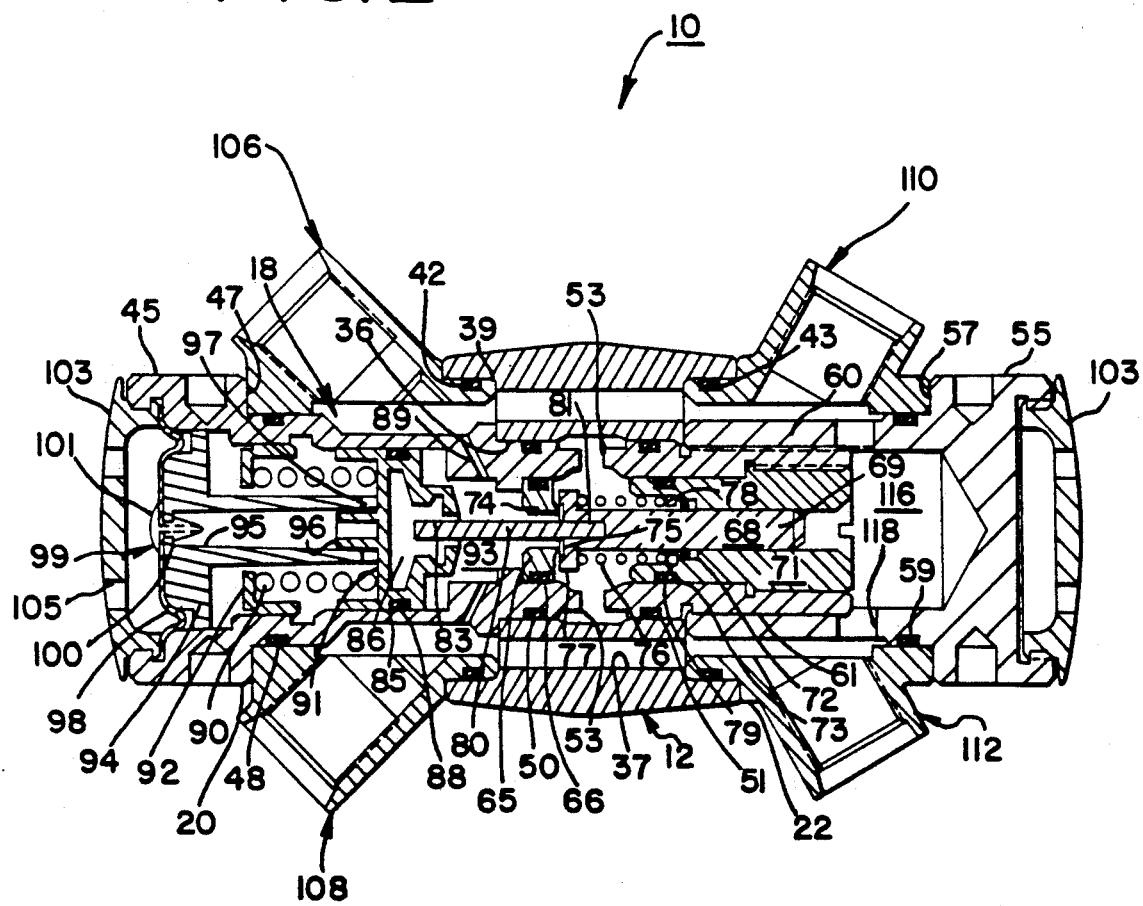

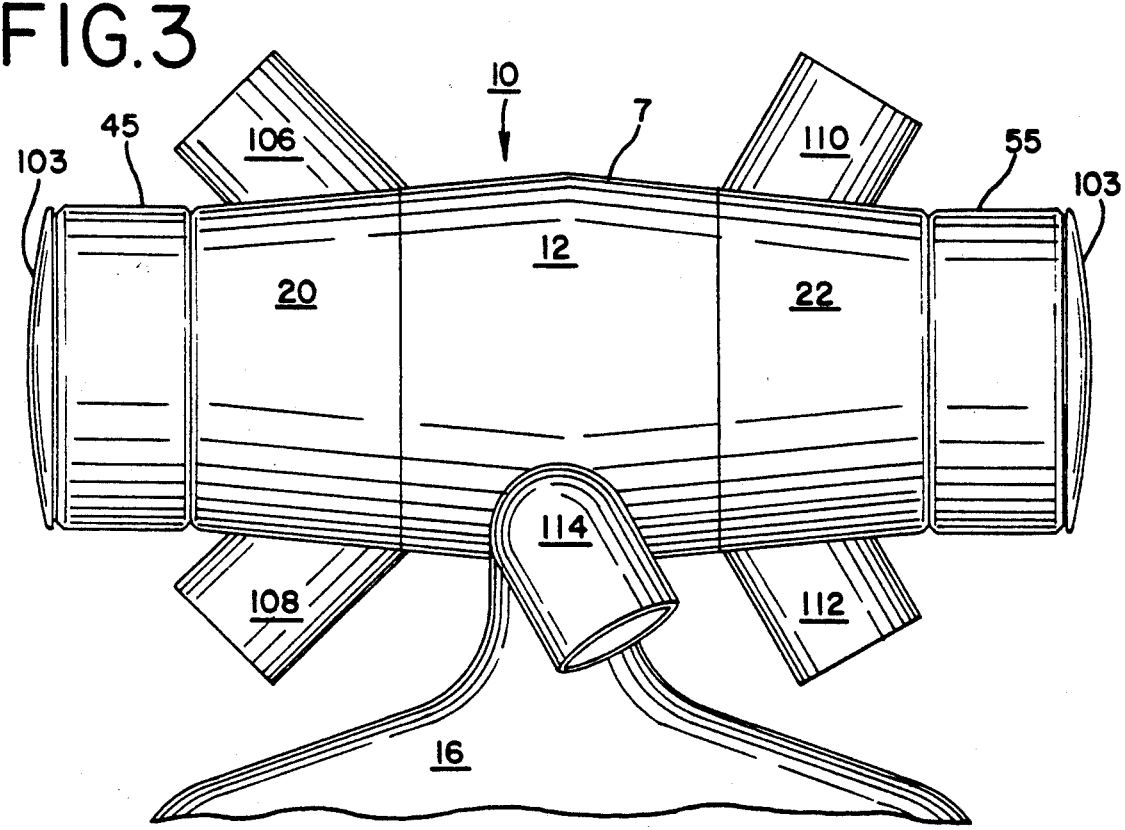
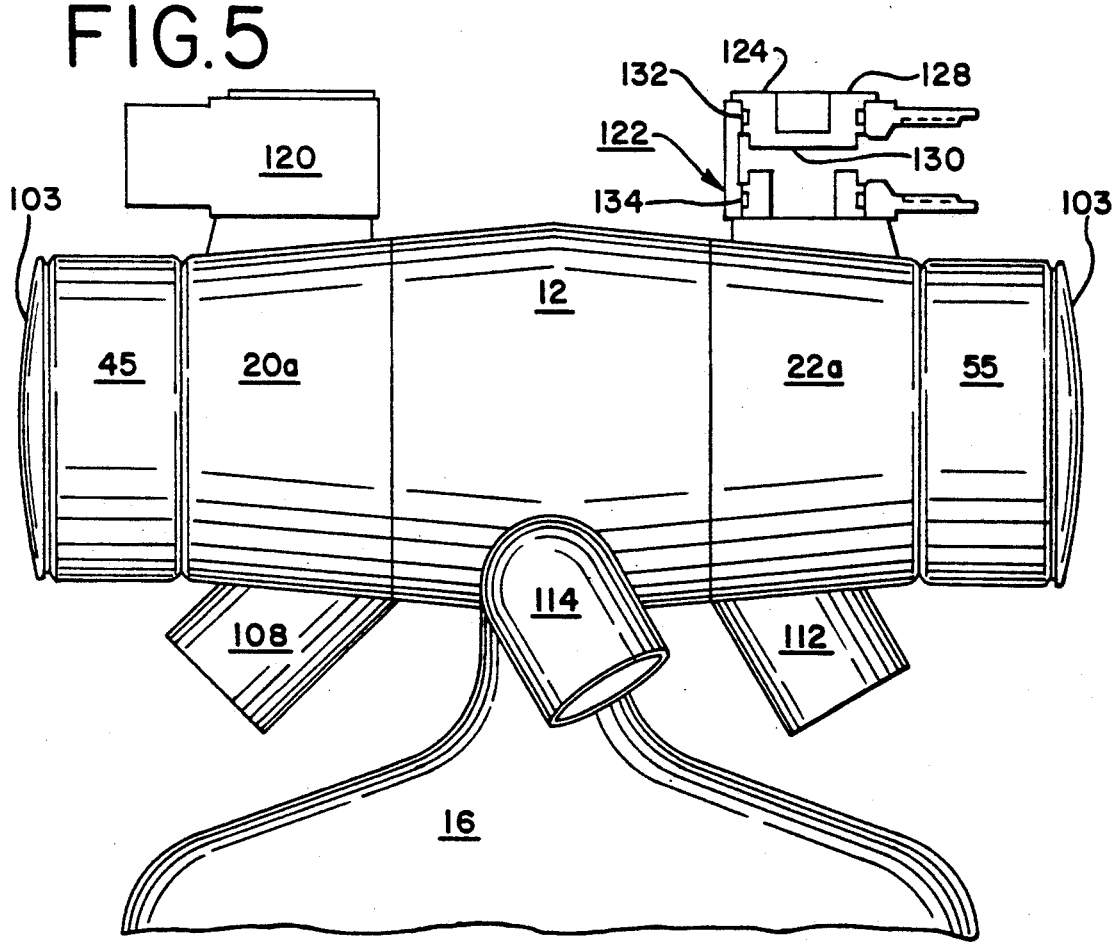

PRESSURE REGULATOR FOR UNDERWATER BREATHING SYSTEM

The present invention relates in general to first stage pressure regulators of the type used in self contained underwater breathing systems, and it relates more particularly to a new and improved first stage pressure regulator which includes an elongate body having a removable valve cartridge subassembly and a multiplicity of swivel mounted air output ports positioned near opposite ends of the body to enable the connection of the air outlet ports of the regulator to different underwater devices and instruments without the connecting hoses becoming entangled. The regulator is adapted to be used with both vertically mounted and angle mounted air supply tanks.

BACKGROUND OF THE INVENTION

It has been the practice in the prior art to mount a first stage pressure regulator directly on the neck of an associated air tank and to provide two or three fixed outlet ports on the regulator for coupling the regulator to the second stage regulator, a pressure gauge, and a buoyancy vest or jacket. As other instruments and devices which depend on air from the air tank are added to the medley of devices carried by the diver, "Y" and "T" connectors have been connected to the outlet ports of the first stage regulator to connect each of the outlet ports to more than one device. This has resulted in a large number of hoses being connected at approximately the same place on the regulator, making it difficult if not impossible to prevent the connecting hoses from becoming entangled with one another. Where additional outlet ports have been provided they have been located for convenience of manufacture rather than for convenience of use by the diver.

Another characteristic of most present day first stage pressure regulators is the fact that maintenance and repair of the valve mechanism has required considerable expertise in disassembly and reassembly of the mechanism. It would be desirable to provide a first stage regulator in which the entire pressure regulating mechanism could be easily removed and replaced when in need of repair.

SUMMARY OF THE INVENTION

Briefly, there is provided in accordance with the present invention a new and improved first stage pressure regulator which is adapted to be mounted directly on the neck of a high pressure air reservoir tank and which has a plurality of reduced, constant pressure outlet ports strategically angled and located about the exterior of the regulator housing. These outlet ports are mounted for rotation about the longitudinal axis of the regulator, and in one embodiment of the invention swivel connectors from which the outlet ports extend are provided to further facilitate orientation of the connecting hoses so as to eliminate entanglement thereof and the consequent interference with the free movement of the arms and legs of the diver.

In accordance with another aspect of the invention the regulator includes an elongate body in which an easily removable, elongate subassembly containing the entire pressure regulating mechanism of the regulator is longitudinally mounted, thereby facilitating repair and maintenance of the regulator in the field.

GENERAL DESCRIPTION OF THE DRAWINGS

A more complete and better understanding of the present invention may be had from a reading of the following detailed description taken in connection with the accompanying drawings wherein:

FIG. 2 is a cross-sectional view of the regulator shown in FIG. 1, taken along the line 2—2 thereof;

FIG. 3 is a side elevational view of the first stage pressure regulator shown in FIGS. 1 and 2;

FIG. 5 is a side elevational view of another regulator embodying the present invention.

DETAILED DESCRIPTION OF A PREFERRED EMBODIMENT

Figure 1:
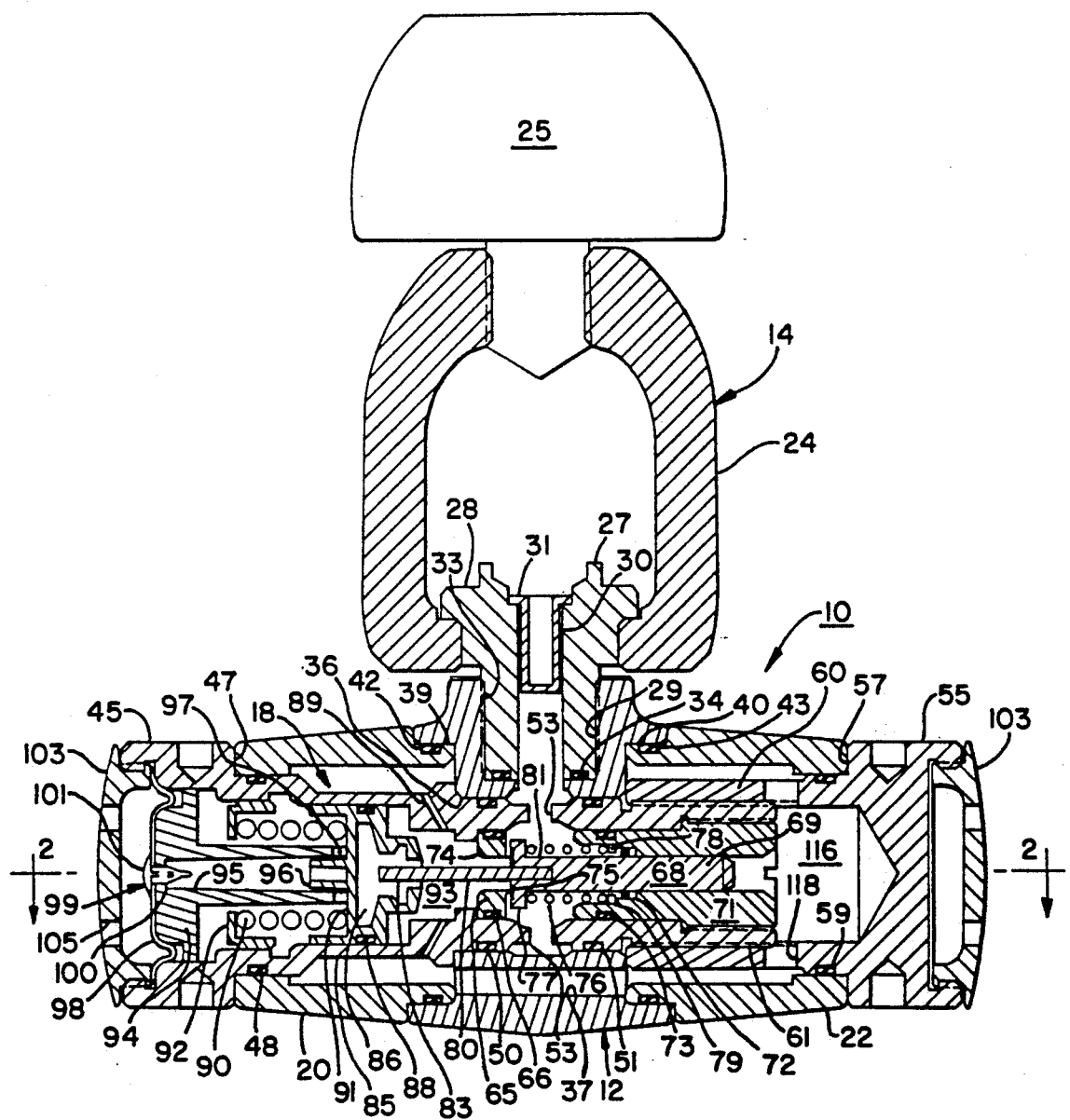
FIG. 1 is a cross-sectional view of a first stage pressure regulator embodying the present invention.
Figure 4:
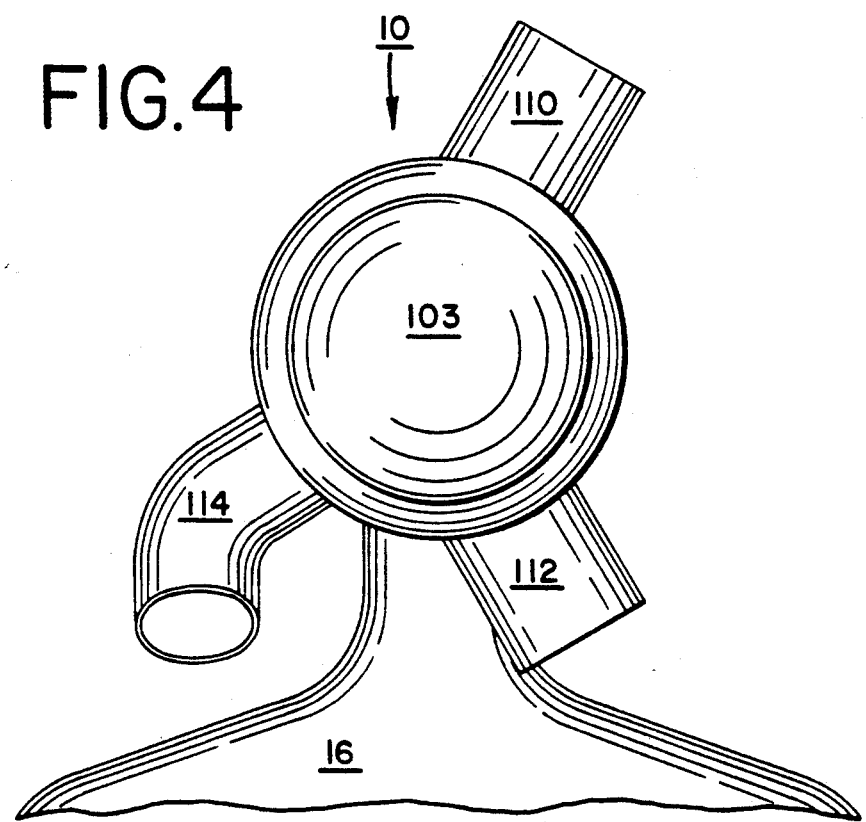
FIG. 4 is an end view of first stage regulator shown in FIG. 3.

Referring particularly to FIGS. 1 through 4, a first stage pressure regulator for use in a self contained underwater breathing system is generally identified by the reference number 10 and includes as its principal elements a housing body 12, a yoke assembly 14 for mounting the regulator to the neck of a conventional pressurized air tank 16, a pressure reducing and regulating mechanism 18 mounted to the housing body 12, and a pair of outlet port connectors 20 and 22 rotatably mounted with respect to the housing body and the pressure reducing and regulating mechanism 18.

A yoke 24 includes a screw assembly 25 for locking the yoke 24 to the neck of a conventional air reservoir tank 16 with an air inlet port 27 of a yoke support member 28 sealably connected to the outlet port in the air reservoir tank. High pressure air from the tank thus enters a central bore 29 in the yoke support member 28 through a cup-shaped filter 30 which is held in place in the bore 29 by an annular external flange on the filter and a snap ring 31 fitted in an annular groove in the member 28 above the top of the filter.

The housing body 12 may be seen to include an internally threaded bore 33 in which the lower end portion of the yoke support member 28 is threadedly secured. An annular sealing member 34 is disposed in a complementary annular groove in the bottom of the yoke support member 28 to provide a seal to the ambient. An opening 36 extends through the body member 12 in a direction transverse to the longitudinal axis of the yoke member 28 for receiving the pressure reducing and regulating mechanism 18, and a plurality of passageways 37 which extend parallel to the longitudinal axis of the opening 36 through the body 12. The opening 36 may be seen to communicate with the bore 29 through the yoke support member 28.

The two swivel outlet port connectors 20 and 22 are tubular and of the same general construction as seen in FIG. 1. The body member 12 is provided with a pair of counterbores 39 and 40 into which the inner ends of the swivel connectors extend and are rotatably disposed. A pair of O-ring type elastomeric sealing members 42 and 43 are carried in complementary annular grooves in the swivel members 20 and 22 for sealing engagement with the walls of the counterbores 39 and 40 to provide seals to the ambient.

The pressure reducing and regulating mechanism is in the form of a removable module which includes an elongate tubular body 45 having an enlarged outer end section providing an annular shoulder 47 which abuts the distal end of the swivel connector 20 to hold the swivel connector in assembled relation with the housing body 12 and the module body 45. An O-ring type resilient sealing member 48 is fitted in a complementary annular groove in the module body 45 for sealing engagement with the inner wall of the swivel connector 20. Two additional O-ring type resilient sealing members 50 and 51 are fitted in complementary annular grooves in the module body 45 for sealing engagement with the wall of the bore 36 through the housing body 12 on opposite sides of a transverse bore 53 in the housing body which connects to the bore 29 in the yoke support member 28.

A cup-shaped member 55 is used to secure the module body 45 in place with respect to the housing body and to secure the swivel connector 22 in place. As may be seen, the member 55 has an enlarged outer end section having an annular shoulder 57 which abuts the outer end of the swivel connector 22, and an annular resilient sealing member 59 is fitted in a complementary annular groove in the member 55 and sealingly engages the wall of the bore through the swivel connector 22 to provide a seal to the ambient. A generally cylindrical end portion 60 of the member 55 is internally threaded and threadedly engages the externally threaded end portion 61 of the module body 45. As thus far described, it will be seen that the pressure reducing and regulating module and the two swivel connectors are held in assembled relationship with the body 12 by the threaded connection between the cup member 55 and the module body 45.

Mounted within the module body 45 is the entire pressure reducing and regulating mechanism which includes a fixedly positioned tubular valve member 65 fitted into the bore in the module body 45 and sealed thereto by an O-ring type elastomeric gasket 66. A valve seat support member 68 includes an elongate stem 69 which is slidably supported in a seat support member 71 having an externally threaded end portion which is threadedly secured to an internally threaded end portion of the module body 45. An O-ring type elastomeric sealing gasket 72 seals the stem 69 to the support member 71, and an O-ring type elastomeric sealing gasket 73 seals the support member 71 to the module body 45.

An annular valve seat 74 mounted in the end of the valve support member 68 is biased against an annular lip 75 on the valve member 65 by a coil spring 76 which is compressed between an annular flange 77 on the valve support member 68 and a washer 78 supported by an internal annular shoulder 79 on the seat support member 71. A push rod 80 has one end positioned in a blind hole 81 in one end of the valve support member 68 and its other end positioned in a blind hole 83 in a piston 85. The piston 85 has a brass central portion 86 molded within a plastic enclosure having an annular outer groove receiving an annular sealing gasket 88 which provides a sliding seal between the piston 85 and the bore of the member 45. A coil spring 90 is compressed between the end 91 of the piston 85 and a spring tension adjusting screw 92 which is threadedly disposed within the bore of the module member 45 to adjust the pressure in an intermediate pressure chamber 93 surrounding the push rod 80. The intermediate pressure chamber 93 is connected to the annular chambers between the module body 45 and the swivels 20 and 22 by means of a plurality of angular holes 89 drilled through the module body 45.

A boost piston 94 having a larger cross-sectional area than that of the piston 85 is slidably positioned in the bore of the member 45 and has a tubular stem 95 having radial grooves 97 which fits over a central stem 96 on the piston 85. A flexible diaphragm 98 is positioned over the outer end of the boost piston 94 and is held in place by a combined attachment and pressure relief plug 99. The plug is molded of an elastomeric material and has a plurality of longitudinally extending grooves which communicate the chamber within the stem 95 and the chamber housing the spring 90 to the base of the plug part 101 to permit air to escape from these chambers if the pressure therein exceeds the ambient pressure.

A cap 103 is threadedly secured to the end of the module body member 45, and presses the peripheral portion of the diaphram 98 into sealing engagement with the body member 45. A plurality of longitudinal holes 105 extend through the cap 103 to connect the outer face of the diaphram 103 to the ambient. An identical cap 103 is mounted to the distal end of the cup shaped member 55.

As best shown in FIG. 2, a pair of tubular intermediate pressure outlet port connectors 106 and 108 are integral with and extend from the sleeve 20 at diametrically opposite positions thereon. A second pair of tubular intermediate pressure outlet port connectors 110 and 112 are integral with and extend from the sleeve 22 at diametrically opposite positions thereon. The longitudinal axes of the connector ports 108 and 112 are each at an angle of about 60 degrees relative to the longitudinal axis of the regulator body. The longitudinal axes of the connector ports 106 and 110 are each at an angle of about 40 degrees relative to the longitudinal axis of the regulator body.

As shown in FIG. 3, a high pressure outlet port 114 extends from the body 12 at a position ninety degrees from the air inlet port. While not visible in FIGS. 1 and 2, it will be understood that the port 114 is connected to the chamber in the module body member housing the valve support member 68 which is always in communication with the air inlet port from the tank 16 whereby high pressure air is always available at the port 114.

Operation

In operation, with the yoke assembly connected to the neck of a high pressure air reservoir tank air enters the regulator through the filter 30 and enters the module body 45 through the transverse bore 53 therein. When a demand for air occurs as a result of a reduction in pressure in the annular chamber between the sleeves 20 and 22 and module body 45 the pressure in the intermediate pressure chamber 93 is also reduced and permits the combined forces exerted by the spring 90 and the ambient pressure acting through the piston 85 to push the valve seat 74 away from the valve member 65 to permit high pressure air to flow to the intermediate pressure outlet ports until the intermediate pressure rises to the predetermined intermediate pressure and permits the spring 76 to close the inlet valve. It will be seen that adjustment of the position of the screw 94 sets the intermediate pressure at which the inlet valve closes. A pressure balancing chamber 116 is connected to the intermediate pressure chamber 93 via radial ports 118 in the member 55, the longitudinal passageways 37 through the body 12, and the holes 89.

Figure 6:
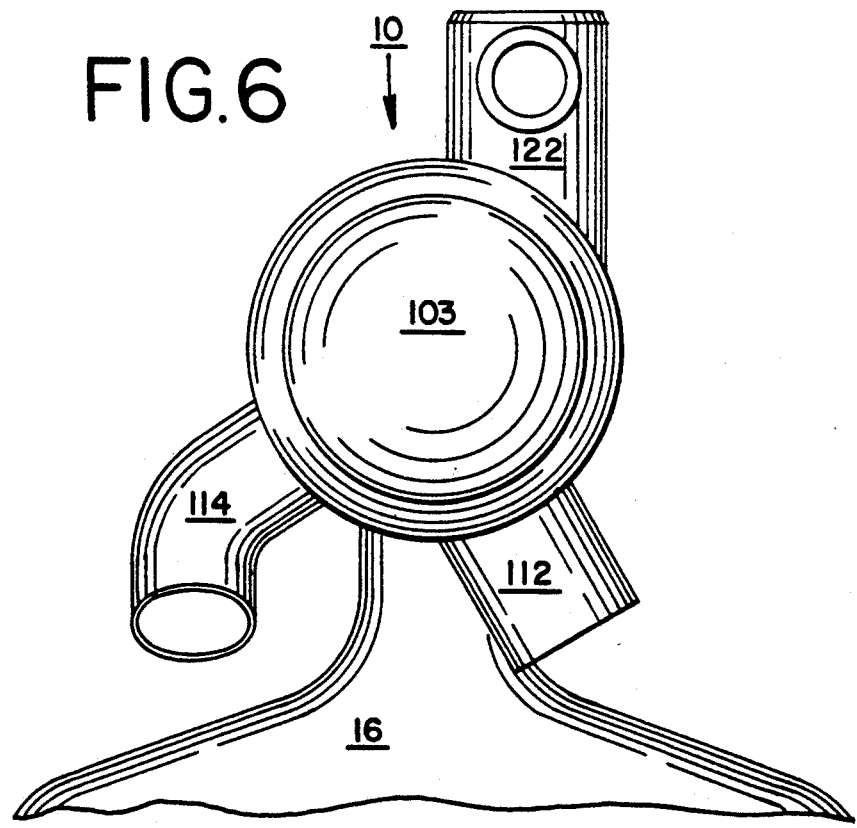
FIG. 6 is an end view of the regulator shown in FIG. 5.

Referring to FIGS. 5 and 6 there is shown an alternative embodiment of the invention wherein the intermediate pressure outlet ports 106 and 110 in the embodiment shown in FIGS. 1 through 4 are replaced by respective outlet port connectors or fittings 120 and 122 which are rotatable about axes which are parallel to one another and perpendicular to the longitudinal axis of the regulator. These connectors are identical and provide outlets which extend parallel to the longitudinal axis of the regulator. As shown, the connector 122 includes a fixedly positioned body section 124 which is threadedly mounted in a radial bore in a swivel 22a and sealed thereto by an O-ring type sealing gasket. A swivel mounted outlet port connector 128 is connected to the central bore in the body section 124 by a transverse hole 130 in the body 124. A pair of O-ring type sealing gaskets 132 and 134 are disposed in complementary annular grooves in the body 124 on opposite sides of the hole 130.

While the present invention has been described in connection with certain embodiments thereof, it will be understood that those skilled in the art may make many changes and modifications which come within the true spirit and scope of the invention. Therefore, it is intended by the appended claims to cover all such changes and modifications which come within the true spirit and scope of the present invention.

What is claimed:

1. A first stage pressure regulator for use in a SCUBA diving system, comprising in combination
    housing means having an opening therethrough having first and second ends and an inlet port adapted to be connected to the outlet port of a pressurized air reservoir tank,
    said inlet port being located intermediate said ends of said opening through said housing means and extending laterally with respect to the longitudinal axis of said opening,
    pressure reducer means releasably mounted within said opening in said housing as a modular unit for reducing the pressure of air supplied thereto from said inlet port to a regulated value, and
    a plurality of reduced pressure air outlet ports extending from the exterior of said housing means for the connection of connector hoses of pneumatically-related underwater devices,
    said outlet ports extending at acute angles relative to the longitudinal axis of said opening through said housing means, the angular disposition of said outlet ports being arranged to diverge from an area proximate to said air inlet port to prevent the connector hoses from becoming entangled.

2. A first stage pressure regulator for use in a SCUBA diving system, comprising in combination
    housing means having an opening therethrough having first and second ends and an inlet port adapted to be connected to the outlet port of a pressurized air reservoir tank,
    said inlet port being located intermediate the ends of said opening through said housing means and extending laterally with respect to the longitudinal axis of said opening through said housing means,
    pressure reducer means mounted within said opening through said housing for reducing the pressure of air supplied thereto from said inlet port to a regulated value,
    a plurality of reduced pressure air outlet ports extending from the exterior of said regulator,
    a plurality of swivel connectors respectively mounted to said plurality of said outlet ports,
    said plurality of said outlet ports extending at acute angles relative to said longitudinal axis of said opening through said housing means, and
    said swivel connectors being connected to ones of said outlet ports respectively located diametrically opposite to said outlet ports extending at acute angles relative to the longitudinal axis of said housing means.

3. The combination according to claim 2, comprising a high pressure outlet port extending from said housing means diametrically opposite to said inlet port.

4. The combination according to claim 1, comprising first and second connector means connected to said housing means for rotation about the longitudinal axis of said elongate housing means,
    said reduced pressure outlet ports extending from said first and second connector means.

5. The combination according to claim 4 wherein said first and second connector means are respectively located between said inlet port and the ends of said pressure reducer means.

6. The combination according to claim 1, comprising first and second connector means connected to said elongate housing means for rotation about the longitudinal axis of said opening through said housing means,
    said reduced pressure outlet ports extending from said first and second connector means.

7. The combination according to claim 6 wherein said pressure reducer means comprises
    an elongate pressure regulating subassembly extending into and through said opening through said housing means from one end thereof, and
    securing means threadedly secured to said elongate subassembly to secure said subassembly to said housing means.

8. The combination according to claim 7, comprising a high pressure outlet port extending from said housing means diametrically opposite to said inlet port.

9. A first stage regulator for use in a SCUBA diving system, comprising in combination
    housing means having an opening extending therethrough having first and second ends, an inlet port adapted to be connected to the outlet port of a pressurized air reservoir, said housing means further including a pair of tubular outlet port connectors mounted on either side of a main housing body,
    pressure reducer means mounted within said housing means for reducing and regulating the pressure of air supplied thereto from said inlet port, said pressure reducer means comprising
    an elongate pressure regulating subassembly extending into said opening through said housing means from one end thereof, and
    securing means threadedly engaged to said elongate subassembly to secure said subassembly to said housing means, said engagement of said securing means and said subassembly also retaining said outlet port connectors to said main housing.

10. The regulator as defined in claim 9 wherein said outlet port connectors are configured to be rotatable relative to said main housing.

11. The regulator as defined in claim 9 wherein at least one of said outlet port connectors includes at least one air outlet port extending from the exterior of said connector at an acute angle relative to the longitudinal axis of said opening through said housing means.

12. The regulator as defined in claim 11 wherein each said outlet port connector includes a pair of air outlet ports extending at diametrically opposite positions.

* * * * *